SPINNING REEL HAVING READILY REMOVABLE
SPOOL AND DUAL PURPOSE RETENTION
AND TRIP SPRING

Filed March 5, 1964 5 Sheets-Sheet 1

INVENTORS
Clifford E. Willis and
Gerald D. Harrington
By Gordon W. Hueschen Att'y.

July 4, 1967 | C. E. WILLIS ETAL | 3,329,372

SPINNING REEL HAVING READILY REMOVABLE
SPOOL AND DUAL PURPOSE RETENTION
AND TRIP SPRING

Filed March 5, 1964 | 5 Sheets-Sheet 2

INVENTORS
Clifford E. Willis and
Gerald D. Harrington
By Gordon W. Hueschen
Att'y.

July 4, 1967 C. E. WILLIS ETAL 3,329,372
SPINNING REEL HAVING READILY REMOVABLE
SPOOL AND DUAL PURPOSE RETENTION
AND TRIP SPRING
Filed March 5, 1964 5 Sheets-Sheet 3

INVENTORS
Clifford E. Willis and
Gerald D. Harrington
By Leonard H. Kueschon Atty July 4, 1967 C. E. WILLIS ETAL 3,329,372

SPINNING REEL HAVING READILY REMOVABLE
SPOOL AND DUAL PURPOSE RETENTION
AND TRIP SPRING

Filed March 5, 1964 5 Sheets-Sheet 4

INVENTORS
Clifford E. Willis and
Gerald D. Harrington
By [signature]
Att'y.

SPINNING REEL HAVING READILY REMOVABLE SPOOL AND DUAL PURPOSE RETENTION AND TRIP SPRING
Filed March 5, 1964 5 Sheets-Sheet 5
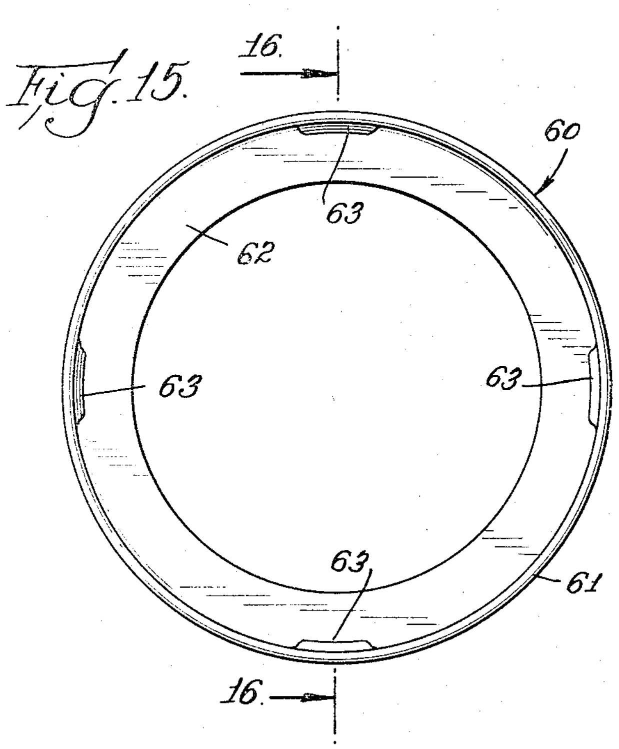
Fig. 15
Fig. 16
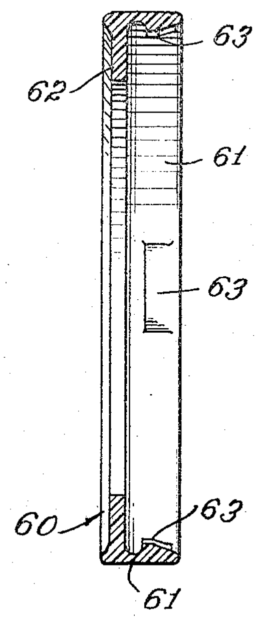
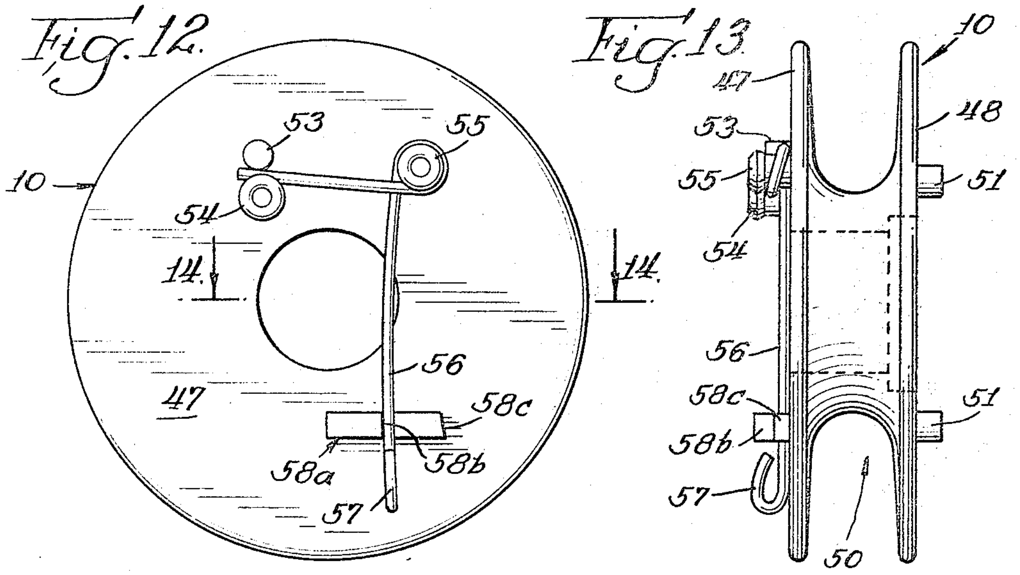
Fig. 12, Fig. 13
Fig. 14
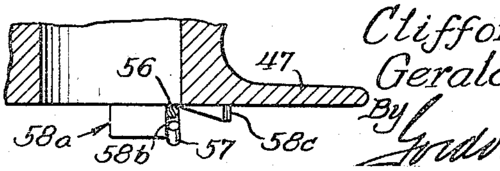
INVENTORS
Clifford E. Willis and
Gerald D. Harrington
By Gordon W. Hueschen
Att'y.

United States Patent Office 3,329,372

Patented July 4, 1967

1

3,329,372

SPINNING REEL HAVING READILY REMOVABLE SPOOL AND DUAL PURPOSE RETENTION AND TRIP SPRING

Clifford E. Willis, Hickory Corners, and Gerald Dale Harrington, Richland, Mich., assignors to Shakespeare Company, Kalamazoo, Mich., a corporation of Michigan Filed Mar. 5, 1964, Ser. No. 349,570
11 Claims. (Cl. 242—84.2)

The present invention relates to spinning reels of the closed-face type, and is more particularly concerned with a novel removable spinning reel spool. The invention is moreover concerned with such spools and spinning reels having such a removable spool retained therein by a novel spring structure, which spring structure in the preferred embodiment of the invention serves both to retain the spool in the reel and as a trip spring to retain the spinning reel structure in line-casting position.

Line pick up in a closed-face spinning reel is generally accomplished by one of two general types of structures. In one structure a pin or finger, mounted on a rotatable pick-up drum, is retractable below the outer rim of the drum for paying out line during casting. When the drum is rotated by the crank and gear arrangement, the pin or finger is extended through the rim of the drum by a cam arrangement and engages the line. The line is thus wound upon a stationary spool.

The other commonly used arrangement for line pick up is a pick-up member in the form of a rotatable cup having teeth or notches at its lip. When the teeth or notches are exposed, the line is engaged and wound on a stationary reel.

In the case of both types of line pick-up arrangement, release of the line for casting or for pay out is accomplished by moving the pick-up member axially forward. The axial movement is also used for a second purpose. By advancing the pick-up device forward beyond the point at which release takes place the forward portion engages the front face of the reel cover, snubbing the line between the front face and the pick-up member, thus securing the line until it is released at the end of the casting motion by permitting the pick-up member to move rearwardly to an intermediate position.

Spinning reels of the closed-face type generally do not have provision for ready removability of the line spool. Such removability is desirable for several reasons. It may be necessary to replace a particular line with one of a larger or smaller diameter, depending upon the type of fishing involved. Moreover, disentanglement of a broken line end from the spool is greatly facilitated by removal of the spool, even where a removable spool flange (as hereinafter further described) is present. Further, sufficient line may be lost as by breakage to require a line change in the field. This operation is difficult to perform under field conditions when the spool is not readily removable. Line replacement is preferably accomplished simply by removing the old spool and replacing it with a new spool of fresh line. Even in those existing reels where the line spool is removable, such removal may in most cases be accomplished only by almost complete disassembly of the reel.

Closed-face spinning reels are generally placed in a

2 casting position by moving the shaft containing the pick-up member forward until a small trip spring engages an annular detent provided in the shaft of the reel. This structure has proven to be highly reliable. However, the spring is difficult to insert during assembly of the reel, and adds considerably to the cost of assembly as well as to material cost. Moreover, when the trip spring breaks during operation, it is extremely difficult to replace by one who is not a skilled repairman. It is accordingly an object of the present invention to provide a spinning reel having a line spool which may be readily inserted and readily removed or replaced. It is a further object to provide such a spinning reel having novel means for securing the removable spool within the reel, which means may be readily disengaged to permit ready removal of the spool. It is a further object to provide a spinning reel of the type described wherein the means serving to secure the spool within the reel also serves as a trip spring in cooperation with an annular detent provided on the shaft of the reel. It is a further object to provide a mechanism of the type described which is simple to operate and which may be inexpensively manufactured. Additional objects and advantages will be apparent to one skilled in the art and still other objects will become apparent hereinafter.

The invention in several of its preferred embodiments is illustrated by the accompanying drawings in which:

FIG. 12 is a front view of a spool showing the retaining structure in another embodiment.

FIG. 13 is a side view of the structure shown in FIG. 12.

FIG. 14 is a fragmentary view of a portion of the spool taken at the line 14—14 of FIG. 12 showing a double detent structure for positioning the retention spring.

FIG. 15 is a rear view of a spool flange.

FIG. 16 is a cross-sectional view taken at the line 16—16 of FIG. 15; and

Figure 1:
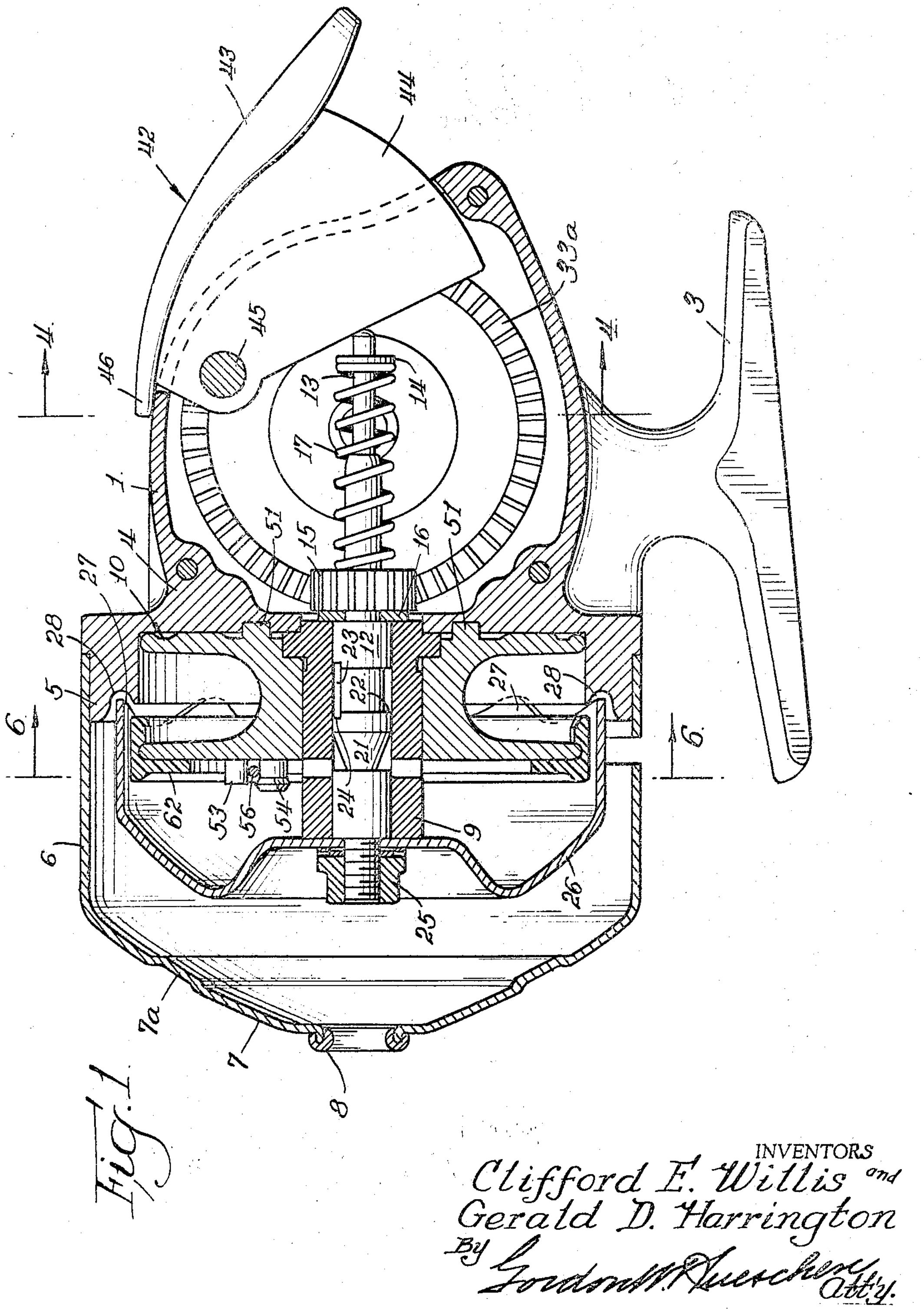
FIG. 1 is a vertical sectional view in the plane of the axis of the reel of the present invention.

According to the invention, a readily removable line spool is provided having a wire retention spring affixed at one end to the spool. The wire spring is biased radially inwardly. In one embodiment a two position detent is provided so that the free end of the wire retention spring may be placed either in the engaging position or the disengaged position. The retention spring is engaged by a suitably arranged slot, notch or groove provided in a stationary spool support member arranged in the reel housing. When the retention spring is placed in the engaging position, it is engaged by the slot of the spool support member and prevented from moving axially. When the retention spring is placed in the disengaged position, the spool is free to be removed by retracting it axially.

In a further and preferred embodiment of the invention the slot provided in the spool support member communicates with the bore of the said member. The retention spring detent is provided with only one stop. When the spool is inserted in the reel and the retention spring is released from the spring detent, the spring enters the slot and rides on the main shaft of the reel. The shaft is provided with an annular detent so positioned that when it is moved forward, to place the pick-up member in a forward position where it becomes disengaged from the line of the spool, the detent engages the retention spring which now serves additionally as a trip spring. The shaft is thus retained in a forward position. A cam groove is also provided in the shaft which, when the shaft is rotated to retrieve the line, trips the retention spring by lifting it above the shaft detent and permits the shaft and the pick-up member to return to the retrieve position. Consequently, in this embodiment the retention spring serves a dual purpose. First, it secures the spool in position within the reel when engaged with the slot of the spool support member. Second, it serves as a trip spring means to cooperate with the shaft detent to restrain the shaft and pick-up member in the line disengaging position. Because of this dual function the need for a separate trip spring normally used for this purpose is eliminated, reducing both material and labor costs in the manufacture of the reel.

Reference is now made to the accompanying drawings for a better understanding of the invention, wherein all of the parts are numbered and wherein the same numbers are used to refer to corresponding parts throughout.

The spinning reel of the invention, shown generally in FIGS. 1–6, comprises a gear housing 1 having a removable cover plate 2. A reel seat 3 is integrally molded together with the gear housing 1. The front wall 4 of the gear housing has a forwardly projecting flange-like head portion 5 which is provided with bayonet fittings 5*a* to receive and engage complementary fittings provided on the edge of a cap member 6. Alternatively threads may be provided on the head portion 5, the edge of the cap being provided with complementary threads to be screwed thereover. As a further alternative, the cap may be slidably mounted over the flange-like head portion 5. The cap member 6 has a conical portion 7 having an annular groove 7*a* and is provided with a line-guide eye 8 at the apex thereof.

A line spool support mamber 9 which also serves as a main bearing is fixedly positioned with regard to front wall 4 by means of an axial bore provided therefor. Mounted over the spool support member 9 is a stationary thread or line spool 10.

A main shaft 12 is journalled through the bore of the spool support member 9 and is free both to rotate and to travel axially. At the reduced end 13 of the main shaft 12 is a snap ring 14 maintained in a groove provided therefor. A pinion gear 15 is slidably mounted over a portion of the main shaft having a square cross section. The bore of the pinion gear has a complementary square cross section so that it may be driven by the main shaft, but yet is free to move axially with respect thereto. A washer 16 serves to space the pinion gear 15 and the main bearing 9. A helical compression spring 17 engaging the pinion gear 15 at one end and the snap ring 14 at the other provides a rearward biasing force for the main shaft 12.

The forward portion of the spool support member 9 is provided at one side with a slot 19 communicating with the bore thereof. The main shaft 12 is provided with a cam taper 21 designed to expand a retention spring 56 mounted on the spool 10 when the main shaft is advanced forward axially. The main shaft 12 is also provided with an annular detent 22 in the form of an annular notch or groove which is engaged by the spring 56 when the main shaft 12 is pushed forward axially. The main shaft is thereby retained in a forward position. A cam notch 23 is also provided, forming a step with the detent notch. As a result of this structure, when the main shaft is in the forward position and is retained by the spring 56, rotation of the main shaft causes the step 24 to provide a cam action for the spring 56 and move it radially outward, releasing the main shaft and permitting the spring 17 to return the shaft to its normal position.

Affixed to the end of the main shaft 12 by means of a nut 25 is a cup-form line pick-up member 26, the lip of which is provided with a plurality of line pick-up teeth 27. An annular groove 28 is provided at the forward edge of the head portion 5 which cooperates with the toothed edge of the pick-up member 26 to pick up the line and wind it on the reel 10 when the pick-up member is rotated. This occurs only when the pick-up member 26 is in its rearwardmost position. When the main shaft 12 is moved forward to the position where it is retained by the retention spring 56, the line slides over the pick-up periphery and is thus free to pay out, as during a cast or otherwise.

Figures 4, 5, 6, 17:
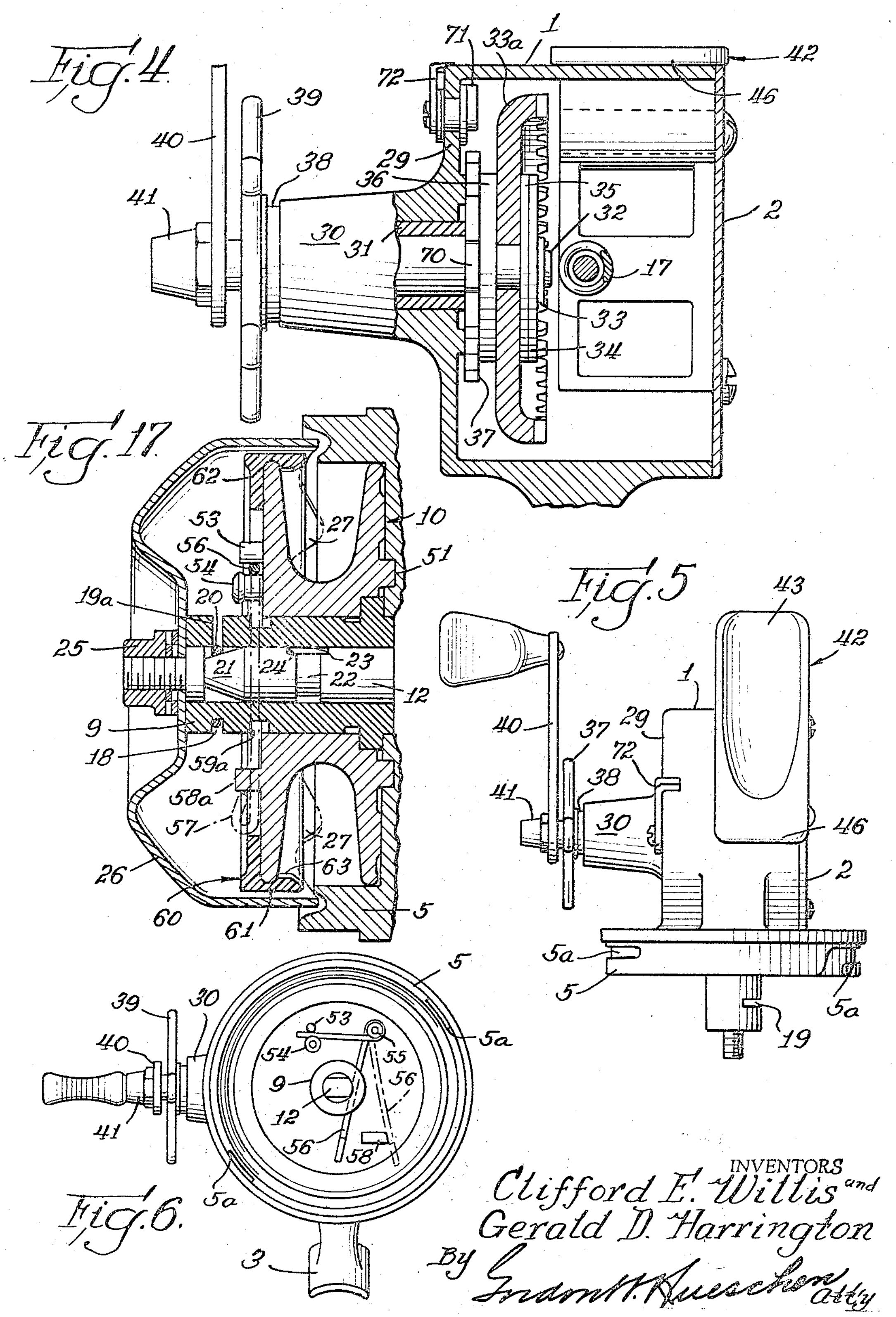
FIG. 4 is a cross-sectional view taken at the line 4—4 of FIG. 1.
FIG. 5 is a reduced top view of a portion of the reel.
FIG. 6 is a reduced cross-sectional view taken at the line 6—6 of FIG. 1.
FIG. 17 is a fragmentary view of another embodiment of the present invention.
Figures 7, 8:
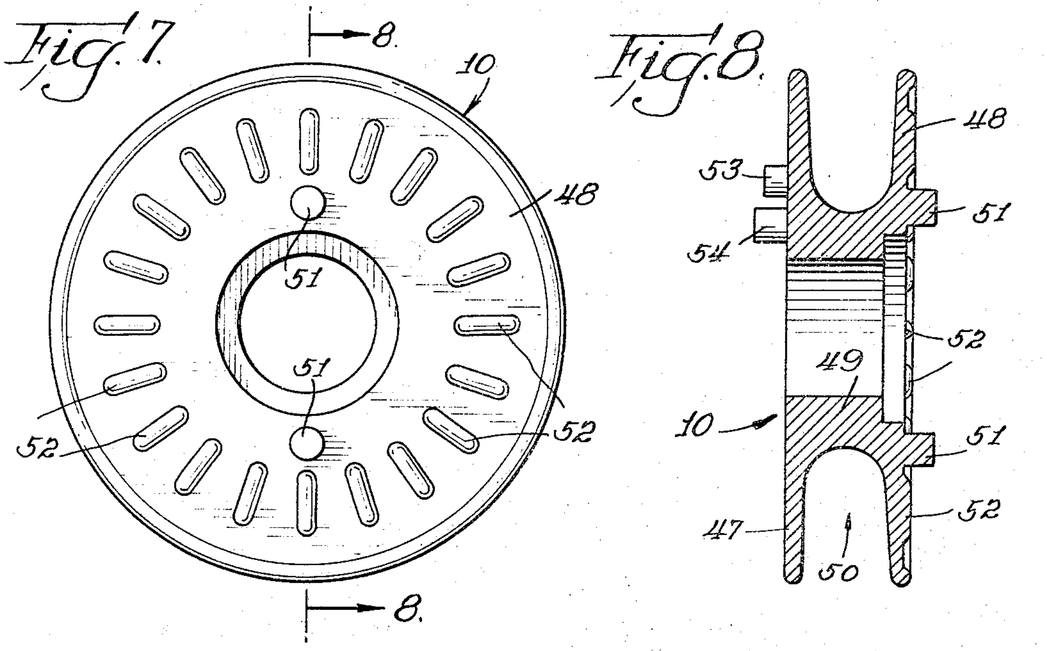
FIG. 7 is a rear view of a spool.
FIG. 8 is a cross-sectional view taken at the line 8—8 of FIG. 7.
Figures 9, 10:
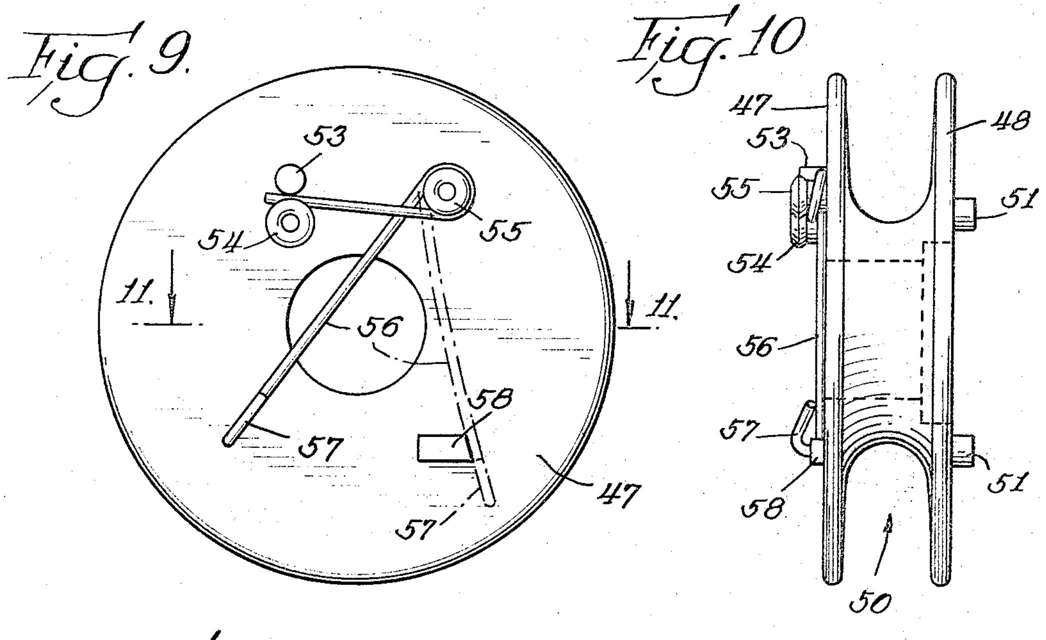
FIG. 9 is a front view of the spool showing the spring retaining structure in one embodiment.
FIG. 10 is a side view of the structure shown in FIG. 9.
Figure 11:
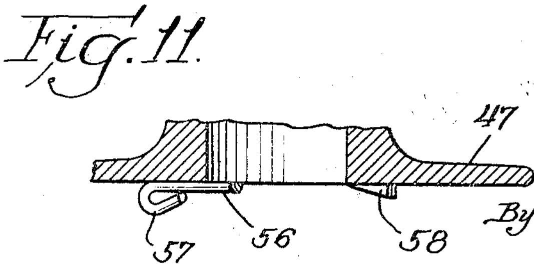
FIG. 11 is a fragmentary view of a portion of the spool taken at the line 11—11 of FIG. 9.

As shown in FIG. 4, a crank shaft housing 30, in which is rotatably journalled a sleeve 31, is mounted on a side wall 29 of the gear housing. Within the sleeve is journalled a crank shaft 32 having a snap ring 33 affixed to one end thereof. Mounted over the crank shaft is a combination assembly comprising a beveled driving gear 33*a* and an adjustable drag assembly. The beveled driving gear 33*a* is arranged to mesh with the pinion gear 15. The adjustable drag assembly comprises a rigid washer 34, friction discs 35 and 36 which may be of any suitable friction material, and a rigid retaining disc 37. The sleeve 31 is provided with a flange 38 to retain it in position. Mounted over a threaded portion of the crank shaft is a drag adjusting wheel 39. As the wheel 39 is tightened, the gear 33*a* is compressed between the friction discs 35 and 36. When the force caused by a pull on the line is greater than the friction established by the assembly, the gear 33*a* slides or rotates even though the crank shaft is maintained in a stationary position, thus permitting the line to pay out. A crank 40 is affixed to a reduced and threaded end of the crank shaft by means of a nut 41.

The arrangement for moving the main shaft 12 and the line pick-up member 26 axially forward from their rearwardmost position to their forwardmost position, as shown in FIG. 1, comprises a thumb push-button lever 42 having a curved flange 43 and a web 44. The push-button lever 42 pivots on a pillar 45 mounted on the cover plate 2. The lever 42 is provided with a detent flange 46 engaging a portion of the housing 1 to prevent the web 44 from leaving the housing. The forward edge of the web 44 engages the end of the main shaft 13.

As shown in FIGS. 6–16, the spool 10 comprises a front wall 47, a rear wall 48, and an axial portion 49 cooperating to define an annular groove 50 about which the line is wound. On the rear wall 48 are a pair of bosses 51. When mounted in the reel, the bosses are inserted into openings provided therefor in the front wall 4 of the gear housing in order to restrain rotation of the spool. A plurality of ribs 52 may be provided to space the surface of the rear wall 48 apart from the front wall 4 of the housing. The front wall 47 is provided with flare studs 53, 54 and 55 about one of which 55 is mounted a retention spring 56 having a loop 57 at its free end for manual engagement. A detent 58 engages the free end of the retention spring 56 when it is expanded to remove the spool. When the spool 10 is inserted over the spool support member 9 which also serves as the main bearing, with the retention spring 56 in the engaging position, the spring is engaged by the retention slot 19 provided in the main bearing 9, and axial movement of the spool is restrained thereby. In FIG. 6 the retention spring 56 is shown by a solid line in the position in which it engages the slot 19, in which case the spool is restricted axially. The retention spring 56 is shown by a broken line in a position in which it is retained by detent 58, in which case the spool is free to slide axially off the spool support member 9.

In the preferred embodiment of the invention the slot 19 provided in the spool support member 9 is so arranged that it communicates with the bore of the spool support member. The detent 58 has a single position and is provided on the spool to engage the spring 56 in the retracted position, wherein it is disengaged from the slot of the spool support member. The spring 56 is biased radially inwardly. Consequently, when the spool is mounted in the reel and the retention spring is disengaged from the detent, the spring is received in the slot and rides on the shaft of the reel. In this embodiment the retention spring serves a dual purpose. First, it retains the spool on the spool support member and prevents axial movement of the spool. Second, it acts as a trip spring in cooperation with the detent 22 of the shaft of the reel, obviating the need for a separate trip spring.

Figures 2, 3:
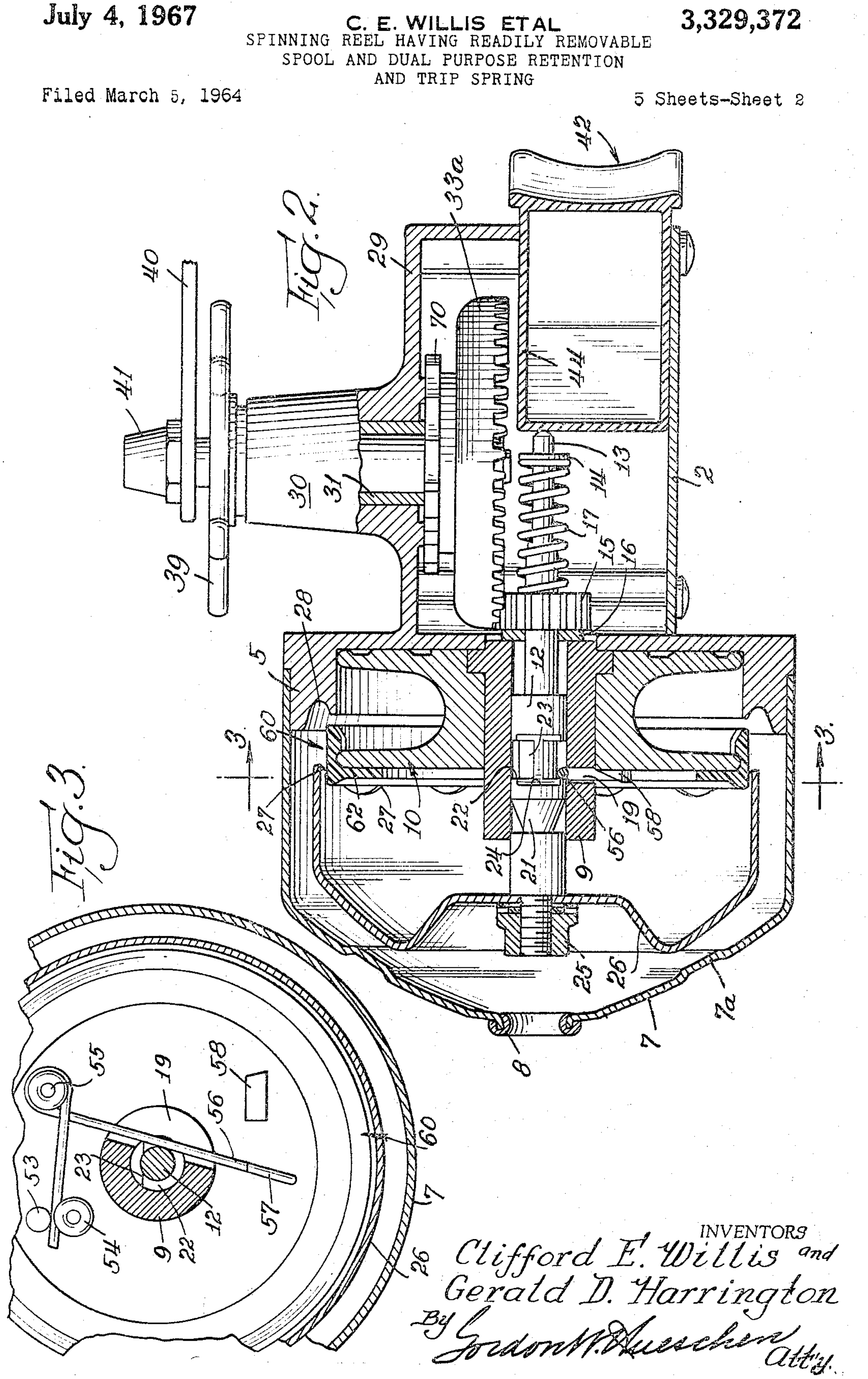
FIG. 2 is a horizontal sectional view in the plane of the axis of the reel.
FIG. 3 is a cross-sectional view taken at the line 3—3 of FIG. 2.

In FIG. 1 the shaft and pick-up member are shown in the normal rest or retrieve position in which both are at their rearwardmost position and the pick-up member is in a position wherein it cooperates with the groove 28 to engage the line. In order to cast, the push-button lever 42 is depressed. This results in the main shaft and the pick-up member being moved forward axially until the forward edge of the pick-up member engages and snubs the line against the annular groove **7*a*. As a result, the line is secured. A cast is then made, at the end of which the push button lever 42 is released. The pick-up member returns to an intermediate position in which the detent 22 is engaged by the retention spring 56. In this position the line is released and is free to be payed out, since the teeth 27 are not in engagement with the annular groove 28. In FIGS. 2 and 3 the reel is shown with the pick-up member and shaft in the intermediate position where they are retained by cooperation of the retention spring 56 and the shaft detent 22. In FIG. 3 the retention spring 56 is shown riding on the reduced portion of the shaft forming the detent 22. The cast may be terminated by once again depressing the push button 42 and snubbing the line. In order to retrieve the line, the crank is turned, tripping the spring 56, and permitting the pick-up member 26 to return to its normal pick-up position with teeth 27 in groove 28**, as shown in FIG. 1.

Although in the preferred embodiment described the present spool is used in a spinning reel in which the retention spring of the spool serves a dual function, it can also be used with reels which have a separate trip spring provided for cooperating with and retaining the shaft and pick-up member in a forward position for casting. Such an embodiment is shown in FIG. 17. In this embodiment a retention groove **59*a* is provided in the spool support member which need not communicate with the bore of the member, but may be provided merely peripherally. This groove 59*a* is engaged by the retention spring 56 when the spool is inserted in the reel. The shaft retention function is provided by means of a circular trip spring 20 which is mounted in an annular groove 18 provided on one side with a notch 19*a* communicating with the bore of the spool support member 9. When the shaft is moved forward by depressing the push button 42, the spring 20 engages the detent 22 and retains the shaft in the forward position. When the shaft is rotated, the cam step 24** expands the spring and permits the shaft to return to its rearward position.

A disengageable click-stop or ratchet means, shown in FIGS. 2, 4 and 5, is provided by an arrangement comprised of ratchet teeth 70 on the disc 37 cooperating with a pawl 71. The click-stop may be engaged or disengaged by means of an external lever 72.

FIGS. 12–14 illustrate a line spool according to an line spool has structure similar to that shown in FIGS. 7–11, but wherein a dual position detent **58*a* engages and positions the free end of the retention spring 56. The detent is shown in detail in FIG. 14, the portion 58*c* being utilized to position the spring for removal of the reel. When the spool 10 is to be inserted over the spool supporting member, such as the main bearing 9, or removed therefrom, the spring 56 is placed in engagement with the detent 58*c*, in which position the spring is out of engagement with the retention groove 59*a*. After the spool has been inserted in the reel, the spring 56 is placed in engagement with the detent 58*b*, whereby the spring engages the retention groove 59*a*** and the spool is retained in place.

As shown generally in the drawings, and particularly in FIGS. 15 and 16, an annular spool flange 60 having an axial wall 61 and a radial wall 62 may be mounted on the forward wall of the spool 10. The axial wall is provided with a plurality of interference ribs 63 for retaining the annular spool flange 60 on the edge of the front wall of the spool.

The spool flange 60 is advantageously designed so that the rear edge of the axial wall is superimposed vertically over a point intermediate the spool front wall 47 and the spool rear wall 48, and preferably equidistant therebetween. This enables the line to be unwound from the reel at substantially the same angle at which it is wound thereon, to prevent snagging between adjacent or overlapping coils of line. If desired the axial wall may also extend a distance forward of the radial wall to prevent line from falling over the front of the flange and becoming wound upon the shaft. The spool flange is preferably made of a plastic material such as nylon, polypropylene, polyethylene, polystyrene, phenolic resins, or other plastic material having a relatively low coefficient of friction with respect to the line. The rear edge of the axial wall of the spool flange as well as the outer surfaces of the axial and radial walls should be provided with as smooth a finish as possible to prevent cutting or abrasive action on the line and to allow free flow during cast.

The present invention has been shown in the drawings and described in a reel embodiment having a tooth-type pick-up member. However, it is equally adaptable to use with spinning reels having a pin-type pick-up member, which type of pick-up is well known in the art.

It is to be understood that the invention is not limited to the exact details of construction, operation, or exact materials or embodiments shown and described, as obvious modifications and equivalents will be apparent to one skilled in the art, and the invention is therefore to be limited only by the scope of the appended claims.

We claim:

1. In a spinning reel, the combination comprising stationary line spool support means coaxially arranged with a rotatable and forward-movable shaft, a normally stationary line spool coaxially mounted over said spool support means having means for disengageably securing said spool to said spool support means comprising a wire retention spring secured at one end to said spool and being biased radially inwardly, said line spool support means being provided with slot means adapted to receive and engage said retention spring for restraint of said spool axially while permitting said retention spring to ride on said shaft, and detent means on said shaft positioned to engage said retention spring when said shaft is moved to a forward position.

2. In a spinning reel, the combination comprising stationary line spool support means coaxially arranged with a rotatable and forward-movable shaft, a normally stationary line spool coaxially mounted over said spool support means having means for disengageably securing said spool to said spool support means comprising a wire retention spring secured at one end to the front wall of said spool and being biased radially inwardly, said line spool support means being provided with slot means adapted to receive and engage said retention spring and restrain said spool axially, and to permit said retention spring to ride on said shaft, detent means on said shaft positioned to engage said retention spring when said shaft is moved to a forward position, and cam means on said shaft arranged to disengage said retention spring from said detent means when said shaft is rotated.

3. A spinning reel comprising a housing, a shaft mounted rotatably in said housing and being axially movable and spring-biased axially rearwardly, means for rotating said shaft, and a line pick-up member affixed to said shaft, means for providing forward axial movement of said shaft, stationary line spool support means coaxially arranged with said shaft, a normally stationary line spool coaxially mounted over said spool support means having means for disengageably securing said spool to said spool support means comprising a wire retention spring secured at one end to the front wall of said spool and being biased radially inwardly, said line spool support means being provided with slot means adapted to receive and engage said retention spring and restrain said spool axially, and to permit said retention spring to ride on said shaft, detent means provided on said shaft and positioned to engage said retention spring when said pick-up member is moved to a forward position, and cam means provided on said shaft arranged to disengage said retention spring from said detent means when said shaft is rotated.

4. A spinning reel according to claim 3 having detent means provided on the front wall of said spool adapted to engage and retain the free portion of said retention spring in a radially outward position disengaged from said spool support means, whereby said spool may be removed from said spinning reel.

5. A spinning reel according to claim 3 wherein the free end of said retention spring is provided with manual engagement means.

6. A spinning reel according to claim 3 having an annular spool flange detachably mounted at the periphery of the front wall of said spool comprising an axial wall positioned over the edge of the front wall of said spool and extending rearwardly of said wall, and means for detachably securing said flange to the periphery of said wall, whereby line drawn axially from said spool can ride on said flange.

7. A spinning reel according to claim 6 wherein said flange is compriser of a plastic material.

8. A spinning reel comprising a housing, a shaft rotatably mounted in said housing and being axially movable and spring-biased axially rearwardly toward the retrieve position, means for rotating said shaft, a line pick-up member affixed to said shaft, means for providing forward axial movement of said shaft to place said pick-up member in the cast position, a stationary tubular line spool support member having an axial bore and mounted in said housing in coaxial arrangement with said shaft, a normally stationary line spool coaxially mounted over said spool support member having means for disengageably securing said spool to said spool support member comprising a wire retention spring secured at one end to the front wall of said spool and being biased radially inwardly, said line spool support member being provided with slot means communicating with the bore thereof adapted to receive and engage said retention spring to restrain said spool axially and to permit said retention spring to ride on said shaft, said shaft being recessed to define an annular detent positioned to engage said retention spring when said pick-up member is moved to a forward position whereat it becomes disengaged from the line of said line spool and permits said line to be payed out freely, and cam means provided on said shaft arranged to disengage said retention spring from said detent when said shaft is rotated, whereby said shaft and pick-up member are permitted to return rearwardly to the retrieve position.

9. A spinning reel comprising a housing, a shaft rotatably mounted in said housing and being axially movable and spring-biased axially rearwardly toward the retrieve position, means for rotating said shaft, a line pick-up member affixed to said shaft, means for providing forward axial movement of said shaft to place said pick-up member in the cast position comprising a push-button lever means pivotally mounted in said housing and means associated therewith engaging the inner end of said shaft, a stationary tubular line spool support member having an axial bore and mounted in said housing in coaxial arrangement with said shaft, a normally stationary line spool coaxially mounted over said spool support member having means for disengageably securing said spool to said spool support member comprising a wire retention spring secured at one end to the front wall of said spool and being biased radially inwardly, said line spool support member being provided with slot means communicating with the bore thereof adapted to receive and engage said retention spring to restrain said spool axially and to permit said retention spring to ride on said shaft, said shaft being recessed to define an annular detent positioned to engage said retention spring when said pick-up member is moved to a forward position whereat it becomes disengaged from the line of said line spool and permits said line to be payed out freely, and cam means provided on said shaft arranged to disengage said tetention spring from said detent when said shaft is rotated, whereby said shaft and pick-up member are permitted to return rearwardly to the retrieve position.

10. A spinning reel comprising, a housing, a shaft mounted rotatably in said housing and being axially movable and spring-biased axially rearwardly, means for rotating said shaft, and a line pick-up member affixed to said shaft, means for providing forward axial movement of said shaft, stationary line spool support means coaxially arranged with said shaft, and a normally stationary line spool coaxially mounted over said spool support means having means for disengageably securing said spool to said spool support means comprising a wire retention spring secured at one end to the front wall of said spool and being biased radially inwardly, the outer surface of the forward wall of said spool being provided with a 2-position detent means adapted to retain the free portion of said retention spring alternatively in an engaged or disengaged position with respect to said line spool support means, said line spool support means being provided with means adapted to engage said retention spring to restrain said spool axially.

11. A spinning reel comprising a housing, a shaft mounted rotatably in said housing and being axially movable and spring-biased axially rearwardly, means for rotating said shaft, and a line pick-up member affixed to said shaft, means for providing forward axial movement of said shaft, stationary line spool support means coaxially arranged with said shaft, and a normally stationary line spool coaxially mounted over said spool support means having means for disengageably securing said spool to said spool support means comprising a wire retention spring secured at one end to the front wall of said spool and being biased radially inwardly, an annular spool flange detachably mounted at the periphery of the front wall of said spool comprising an axial wall positioned over the edge of the front wall of said spool and extending rearwardly of said wall, and means for detachably securing said flange to the periphery of said wall, whereby line drawn axially from said spool can ride on said flange, said line spool support means being provided with means adapted to engage said retention spring to retrain said spool axially, and the front wall of said spool being provided with detent means adapted to engage and retain the free portion of said retention spring in a radially outward position disengaged from said spool support means, whereby said spool may be inserted into or removed from said spinning reel.

References Cited

UNITED STATES PATENTS

| | | | |
|---|---|---|---|
| 409,735 | 8/1889 | Dixson | 292—87 |
| 706,113 | 8/1902 | Roebuck et al. | 242—68 |
| 1,364,249 | 1/1921 | Cetwick | 242—68 |
| 2,523,827 | 9/1950 | Holm | 242—84 |
| 2,865,662 | 12/1958 | Nurmse | 287—53 |
| 2,884,211 | 4/1959 | Holahan | 242—84 |
| 2,973,916 | 3/1961 | Shakespeare | 242—84 |
| 2,989,266 | 6/1961 | Yeada | 242—84 |
| 3,074,664 | 1/1963 | Beger | 242—84 |
| 3,152,771 | 10/1964 | Maury et al. | 242—84 |

FOREIGN PATENTS

| | | |
|---|---|---|
| 136,660 | 12/1952 | Sweden. |

STANLEY N. GILREATH, *Primary Examiner.*

MERVIN STEIN, FRANK J. COHEN, *Examiners.*

B. S. TAYLOR, *Assistant Examiner.*